US006440380B1

(12) United States Patent
Heise et al.

(10) Patent No.: US 6,440,380 B1
(45) Date of Patent: Aug. 27, 2002

(54) PREPARATION OF PHOSPHORUS (I) OXIDES, PHOSPHORUS (III) OXIDES, AND LOWER HYDRIDES OF PHOSPHORUS BY CATALYTIC REDUCTION OF PHOSPHORUS (V) OXIDES

(75) Inventors: Jerald D. Heise, St. Louis; Erik D. Sall, Chesterfield, both of MO (US)

(73) Assignee: Monsanto Technology, LLC, St. Louis, MO (US)

( * ) Notice: Subject to any disclaimer, the term of this patent is extended or adjusted under 35 U.S.C. 154(b) by 0 days.

(21) Appl. No.: 09/461,635

(22) Filed: Dec. 14, 1999

Related U.S. Application Data

(60) Provisional application No. 60/112,259, filed on Dec. 15, 1998.

(51) Int. Cl.$^7$ .............................................. C01B 25/00
(52) U.S. Cl. ...................... 423/299; 423/304; 423/316
(58) Field of Search ................................ 423/299, 304, 423/316

(56) References Cited

U.S. PATENT DOCUMENTS

| 3,652,437 A | * | 3/1972 | Mezey et al. ................ 423/299 |
| 4,021,321 A | | 5/1977 | White |
| 4,136,155 A | * | 1/1979 | Hestermann et al. ........ 423/299 |
| 4,374,816 A | * | 2/1983 | Arzoumanidis et al. ..... 423/304 |
| 4,980,142 A | | 12/1990 | McGilvery et al. |

FOREIGN PATENT DOCUMENTS

| DE | 292639 A5 | 8/1991 | |
| GB | 823483 | * 11/1959 | .................. 423/299 |
| GB | 1264275 | 2/1972 | |

OTHER PUBLICATIONS

Pourbais, M. "Atlas of Electrochemical Equilibria in Aqueous Solutions," Section 18.2, "Phosphorus," 1974, pp. 504–515, No month.
Personne, M. "Decomposition of Water by Phosphorus, Arsenic, and Antimony Under the Influence of Nitric Acid, with Ammonia Production," Reports Presented at the Chemical Society, Bull. Soc. Chim. (2) 1, 163–5 (1864), No month.

Wieland, H., "Concerning the Mechanism of Oxidation Processes VI; 1. Concerning Oxygen Activation by Metallic Copper," Justus Liebig's Annalen der Chemie, 434:185–203, 1924, No month.
Moser, H., et al., "Effect of Atropisomerism and Chiral Center on the Biological Activity of Metolachlor," Z. Naturforsch, 37b, 451–462 (1982), No month.
Franke, W., et al, "The Mechanism of Hypophosphite Cleavage According to Experiments with Deuteriumas the Indicator," Justus Liebigs Annalen der Chemie, vol. 550, 1941, pp. 1–31, No month.
Bakh, N., "The Mechanism of the Poisoning of Catalyst," The Chemical Institute, Supreme Council of the National Economy, Named for L. Ya. Karpov, Moscow, No date.
Ezz, S.Y., et al., "Effect of Hydrogen on Phosphorus Compounds Present in Iron Ores," J. Chem. U.A.R., 10. No. 1, 97–107 (1967), No month.
Kirk–Othmer Concise Encyclopedia of Chemical Technology, "Phosphorus Compounds," John Wiley & Sons, New York, 1985, pp. 872–874, No month.
Kirk–Othmer Encyclopedia of Chemical Technology, vol. X, Interscience Encyclopedia, "Properties and Chemistry of Phosphorus and its Compounds," 1953, pp. 403–510, No month.
Engel, R., "On the Oxidation of Hypophosphorus Acid by Hydrogenated Palladium in the Absence of Oxygen," C.R. Acad. Sci. vol. 110, pp. 786–787, Jan.–Jun. 1890.

* cited by examiner

Primary Examiner—Steven Bos
(74) Attorney, Agent, or Firm—Senniger, Powers, Leavitt & Roedel; Joseph A. Schaper

(57) ABSTRACT

A process for the manufacture of phosphorus (I) species, phosphorus (III) species, and lower hydrides of phosphorus from phosphorus (V) species is provided. Particularly, the present invention is directed to a process for the preparation of P(I) species, P(III) species, and lower hydrides of phosphorus, wherein the process comprises contacting a P(V) species with a reducing agent in the presence of a catalyst effective to promote reduction of the P(V) species by reaction with a reducing agent. Preferably the reducing agent comprises hydrogen.

36 Claims, No Drawings

PREPARATION OF PHOSPHORUS (I) OXIDES, PHOSPHORUS (III) OXIDES, AND LOWER HYDRIDES OF PHOSPHORUS BY CATALYTIC REDUCTION OF PHOSPHORUS (V) OXIDES

This application claims the benefit of U.S. provisional application Serial No. 60/112,259 filed Dec. 15, 1998.

FIELD OF THE INVENTION

This invention relates to the preparation of phosphorus oxides and lower hydrides of phosphorus, and particularly to novel processes for the preparation of phosphorus (I) species and phosphorus (III) species.

BACKGROUND OF THE INVENTION

Phosphorus (I) oxides (P(I) oxides) and phosphorus (III) oxides (P(III) oxides), including oxyacids of phosphorus, are important precursors for the synthesis of other phosphorus species having various applications. Applications for such phosphorus oxides include use in herbicides, insecticides, fertilizers, flame retardants, and plasticizers.

Phosphorous acid ($H_3PO_3$), a P(III) oxide, is manufactured by hydrolyzing a halogen derivative of phosphorus, such as phosphorus trichloride ("Properties and Chemistry of Phosphorus and Its Compounds," *Encyclopedia of Chemical Technology*, Vol. X, Interscience Encyclopedia, Inc., pp. 403–510, 1953, herein incorporated by reference). Hydrolysis of the phosphorus halogen derivatives produces undesired waste streams, such as sodium chloride, which are difficult and expensive to eliminate.

Hypophosphorous acid ($H_3PO_2$, a P(I) oxide) and hypophosphite salts are made by the oxidation of white phosphorus in the presence of base. For example, hypophosphites are prepared by contacting white phosphorus with a boiling lime slurry. Additionally, by-products of this reaction are calcium phosphite and calcium sulfate, which must be separated from the hypophosphite (*Kirk-Othmer Concise Encyclopedia of Chemical Technology*, John Wiley & Sons, New York, 1985, p. 874, herein incorporated by reference). A limitation to this method is that elemental phosphorus starting material is pyrophoric and poses a safety and handling hazard.

Phosphine ($PH_3$) and other lower hydrides of phosphorus are strong electron pair donors and are frequently used in the manufacture of semiconductors. In other applications, they are often used as ligands in catalysts and to increase the solubility of metals in various liquid media. Phosphine is manufactured by hydrolyzing a metal phosphide such as $Ca_3P_2$ or AlP. Alternatively, it may be made by reacting elemental phosphorus with water under acid- or base-catalyzed conditions ("Properties and Chemistry of Phosphorus and Its Compounds," *Encyclopedia of Chemical Technology*, Vol. X, pp.403–510). These routes to phosphine are problematic because the starting materials can spontaneously combust and are toxic.

Phosphoric acid ($H_3PO_4$) is a potential starting point for the synthesis of a variety of phosphorus species. However, the phosphorus in phosphoric acid has a high oxidation state and high thermochemical stability. This stability has to this time made the large-scale conversion of phosphoric acid and other phosphorus (V) species (P(V) species) such as phosphorus pentoxide or phosphorus pentasulfide to phosphorus species of lower oxidation states generally unfeasible from an economic perspective. The hydrogen reduction of trace levels of calcium phosphate in iron ore at 600–1300° C. to elemental phosphorus and to phosphine gas is reported by Ezz and Shehata, *J. Chem. U.A.R.* (1967), 10(1), 97–107 (herein incorporated by reference). However, that reaction is limited by its inability to stop the reduction at P(I) or P(III) oxidation states. It is further limited by the low concentrations of starting material and products.

SUMMARY OF THE INVENTION

Among the several embodiments of the present invention is a process for the manufacture of lower oxyacids of phosphorus, especially phosphorous acid and hypophosphorous acid. One embodiment of the present invention is a process for the preparation of P(I) species, P(III) species, and lower hydrides of phosphorus, wherein the process comprises contacting a P(V) species with a reducing agent in the presence of a catalyst effective to promote reduction of the P(V) species by reaction with a reducing agent. Preferably the reducing agent comprises hydrogen.

In a preferred embodiment, the present invention is a process for the preparation of hypophosphorous acid, phosphorous acid, or mixtures thereof, wherein the process comprises contacting phosphoric acid, a phosphate salt, a polymeric phosphate, or a phosphoric acid anhydride with a reducing agent in the presence of a catalyst effective to promote reduction of the phosphoric acid, phosphate salt, polymeric phosphate, or phosphoric acid anhydride by reaction with a reducing agent. Preferably the reducing agent comprises hydrogen.

In another embodiment, the invention also includes a composition effective for use in the manufacture of lower oxyacids or lower hydrides of phosphorus. The composition comprises a mixture containing a P(V) species and a catalyst effective to promote reduction of the P(V) oxide or sulfide to a P(I) species, P(III) species, or lower hydrides of phosphorus by reaction with a reducing agent, preferably hydrogen.

Further scope of the applicability of the present invention will become apparent from the detailed description provided below. However, it should be understood that the following detailed description and examples, while indicating preferred embodiments of the invention, are given by way of illustration only since various changes and modifications within the spirit and scope of the invention will become apparent to those skilled in the art from this detailed description.

DETAILED DESCRIPTION OF THE PREFERRED EMBODIMENTS

An economic and environmental advantage could be realized by preparing phosphorous acid directly from phosphorus (V) oxides (P(V) oxides) such as phosphate, phosphoric acid, or phosphorus pentoxide ($P_2O_5$). Direct preparation from P(V) oxides could provide environmental benefits by avoiding the use of halogen-containing phosphorus starting materials and production of halogen-containing by-products.

Furthermore, it would be economically advantageous if hypophosphorous acid can be prepared directly from inexpensive and stable starting materials without the additional step of separation of hypophosphorous acid from phosphite by-products. It would also be advantageous to have an economically feasible method of preparing hypophosphorous acid which does not involve handling highly caustic materials such as boiling lime and does not use unstable pyrophoric starting materials such as white phosphorus.

A cost-effective route to phosphine which uses thermochemically stable starting materials having relatively low toxicity would be particularly advantageous.

P(V) species such as phosphoric acid, its salts, polymers, anhydrides, and sulfur derivatives are inviting starting materials for the preparation of other phosphorus species. The P(V) species are abundant and relatively inexpensive. Phosphoric acid and its salts are thermochemically very stable and have very low toxicity.

A need exists for a convenient, environmentally-compatible, safe, and cost-effective process for the reduction of P(V) species to P(I) species, P(III) species, or lower hydrides of phosphorus. A process which addresses these needs is now disclosed. Among the several embodiments of the present invention is a process for the manufacture of lower oxyacids of phosphorus, especially phosphorous acid and hypophosphorous acid.

The following detailed description is provided to aid those skilled in the art in practicing the present invention. Even so, this detailed description should not be construed to unduly limit the present invention as modifications and variations in the embodiments discussed herein can be made by those of ordinary skill in the art without departing from the spirit or scope of the present invention.

The contents of each of the references cited herein, including the contents of the references cited within these primary references, are herein incorporated by reference in their entirety.

a. Definitions

The following definitions are provided in order to aid the reader in understanding the detailed description of the present invention:

"P(V)" means a phosphorus atom which is in the +5 valence state.

"P(V) species" means a compound or ion which comprises at least one P(V) phosphorus atom.

"P(I)" means a phosphorus atom which is in the +1 valence state.

"P(I) species" means a compound or ion which comprises at least one P(I) phosphorus atom.

"P(III)" means a phosphorus atom which is in the +3 valence state.

"P(III) species" means a compound or ion which comprises at least one P(III) phosphorus atom.

"Lower hydride of phosphorus" means a compound or ion comprising phosphorus and hydrogen and in which phosphorus is bonded directly to hydrogen or to another phosphorus atom. Lower hydrides of phosphorus include, for example, $PH_3$ and $P_2H_4$.

"Oxyacid of phosphorus" means an oxygen-containing acid of phosphorus. This includes, for example, phosphoric acid, polyphosphoric acid, phosphorous acid, hypophosphorous acid, pyrophosphorous acid, and hypophosphonic acid.

"Lower oxyacids of phosphorus" means P(I) and P(III) oxyacids of phosphorus. This includes, for example, phosphorous acid and hypophosphorous acid.

b. Process Details

In accordance with the present invention, P(V) species can be caused to react with a reducing agent in the presence of a reducing catalyst for the reaction, to produce P(I) species, P(III) species, or lower hydrides of phosphorus. In the present disclosure, the term "reducing catalyst" refers to any catalyst which catalyzes the reduction reaction of the present invention. However, one of skill in the art will recognize that such a catalyst, by principles of microscopic reversibility, can also catalyze the reverse oxidation reaction.

Generically, the reduction reaction of the instant invention is shown in Eq. 1.

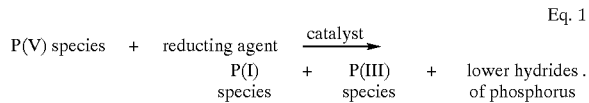

$$P(V)\ species\ +\ reducting\ agent\ \xrightarrow{catalyst}\ P(I)\ species\ +\ P(III)\ species\ +\ lower\ hydrides\ of\ phosphorus \quad\text{Eq. 1}$$

A variety of P(V) species can be employed in this reaction, including without limitation phosphoric acid and its salts, phosphorus pentoxide, phosphorus pentasulfide, phosphorus sulfoxide ($P_2O_3S_2$ and oligomers or polymers thereof), pyrophosphoric acid and its salts, metaphosphoric acid and its salts, and polymetaphosphoric acid and its salts. Preferably the P(V) species is a P(V) oxide, and more preferably phosphoric acid, its salts, its polymers, or its anhydrides. Still more preferably the P(V) species is phosphoric acid or its salts. Alternatively, mixed valent anhydrides can be used as a starting material in the present invention provided that one or more of the phosphorus atoms in the mixed valent anhydride is in the +5 oxidation state.

Under one embodiment of the present invention conditions can be selected such that a mixture comprising P(I) species and P(III) species is prepared. For example, phosphoric acid can be treated with a reducing agent in the presence of a reducing catalyst to form a mixture comprising phosphorous acid and hypophosphorous acid. In another embodiment, conditions can be selected such that P(I) species preponderate in the product mixture over P(III) species. Alternatively, reaction conditions can be selected such that P(III) species preponderate over P(I) species in the product mixture.

In a particularly preferred embodiment of the present invention, the reducing agent comprises hydrogen.

Preferably the reducing catalyst comprises a transition metal, more preferably a Group VIII transition metal, still more preferably Pd, Rh, Ni, or Pt, and more preferably yet Pd. The term "Group VIII transition metal" refers to the metals in Group VIII of the CAS version of the periodic table (*Hawley's Condensed Chemical Dictionary*, 13th Ed., Van Nordstrand Reinhold, pub., New York, overleaf, 1997, herein incorporated by reference).

When the reducing agent is hydrogen, the process of the present invention can conveniently be carried out at hydrogen pressures of between about 50 to about 50,000 kPa, preferably between about 100 to about 25,000 kPa, more preferably between about 100 to about 15,000 kPa, and still more preferably between about 100 to about 10,000 kPa.

It is possible to influence the distribution of products by adjusting the hydrogen pressure of the process. For example, running the reaction at higher hydrogen pressures will tend to cause significant reduction of the P(V) species leading to increased formation of P(I) species and lower hydrides of phosphorus relative to running the reaction at lower hydrogen pressures.

The process of the present invention can be run over a wide range of temperatures. Conveniently, the process can be carried out at temperatures from about 0° C. to about 1000° C., preferably from about 25° C. to about 750° C., more preferably from about 100° C. to about 500° C.

The process of the present invention can be carried out in a liquid medium. The liquid medium can comprise, for example, molten phosphoric acid or molten polyphosphoric acid. Alternatively the liquid medium can comprise a solvent. Solvents which are appropriate for this process include water, hydrogen sulfide, alcohols, carbonyl compounds, hydrocarbons, aromatic solvents, polar aprotic solvents, carbon disulfide, and supercritical fluids such as supercritical carbon dioxide. Hydrocarbons are preferred as solvents. If the solvent comprises a supercritical fluid, carbon dioxide is a preferred supercritical fluid.

The liquid medium can comprise, for example, a solution or a slurry. The liquid medium can also comprise, for example, a bi- or multi-phasic liquid such as an oil-in-water emulsion or a water-in-oil emulsion.

The process of the present invention can be carried out in a gas phase or at the interface between a gas phase and a condensed phase. The gas phase can comprise, for example, an ester of phosphoric acid. The condensed phase can comprise a liquid, or liquid droplets suspended in the gas phase, or a solid such as a solid transition metal catalyst.

In one embodiment, the process of the present invention can be carried out in a batch or a semi-batch mode. The process of the present invention can also be accomplished in a continuous reactor, for example a tube reactor, packed with a catalyst.

A byproduct of the reduction of P(V) species is typically water or hydrogen sulfide ($H_2S$). The reduction reaction can conveniently be run by removing from the reaction mixture the water or $H_2S$ as it is formed. One advantage to such removal is that it can aid in driving the reaction to greater conversion. Preferably, the reaction is performed in a liquid medium while hydrogen gas is bubbled through the liquid medium, thereby removing by-product water or $H_2S$.

Hypophosphite is converted into phosphite in low yield by action of alkali ("Properties and Chemistry of Phosphorus and Its Compounds," *Encyclopedia of Chemical Technology*, Vol. X, Interscience Encyclopedia, Inc., New York, p. 488 (1953), herein incorporated by reference). Engel and Friedel reported a reaction in which a palladium-containing catalyst decomposed hypophosphorous acid or hypophosphite to produce quantities of hydrogen gas (M. R. Engel and M. Friedel, *Compt. Rend. Acad. Sci .,* 1890, pp. 785–787, herein incorporated by reference).

In the instant invention, reduction of a P(V) species can proceed to P(III) species and either stop there or be further reduced to P(I) species either in the same reaction step or in a series of reaction steps. Alternatively, it is contemplated that reduction of a P(V) species can proceed directly to either P(I) species or to P(III) species without the intermediacy of other oxidation states. In any of these alternatives, it is contemplated as part of the present invention that P(I) species can be present in the product mixture.

Accordingly, one aspect of the present invention is a process for making phosphorous acid, its salts, its polymers, or its anhydrides (collectively, "phosphorous species") wherein the process comprises oxidation of a P(I) species produced in a reaction of P(V) species with a reducing agent in the presence of a reducing catalyst. In one embodiment of the current invention, such oxidation reaction comprises contacting the P(I) species with water in the presence of an oxidizing catalyst for the reaction to produce a phosphorous species. Conditions can be selected under which the reducing catalyst for the production of the P(I) species can also be used effectively as the oxidizing catalyst for the production of a phosphorous species from the P(I) species. The P(I) species optionally can be oxidized to a phosphorous species in situ (i.e., in the same reaction or product mixture) as the reduction of the P(V) species, or sequentially with the reduction of the P(V) species.

Another aspect of the present invention is a composition effective for use in the manufacture of oxyacids of phosphorus or salts thereof wherein the composition comprises a mixture containing phosphoric acid or salts thereof, and a catalyst effective to promote reduction of phosphoric acid or salts thereof by reaction with a reducing agent. In a preferred embodiment the reducing agent comprises hydrogen. The catalyst can comprise a transition metal, preferably Pd, Rh, Ni, or Pt. More preferably, the catalyst comprises Pd or Ni. Still more preferably, the catalyst is Pd or Raney Ni. The catalyst can be present in the composition in a proportion between about 0.001 about 20 mole percent, preferably between about 0.01 and about 10 mole percent, more preferably between about 0.05 and about 5 mole percent. In a preferred embodiment of the present invention, the composition consists essentially of phosphoric acid, hydrogen, and a transition metal catalyst.

Detailed Preparative Methods

The starting materials for use in the methods of preparation of the invention are known or can be prepared by conventional methods known to a skilled person or in an analogous manner to processes described in the art.

Generally, the process methods of the present invention can be performed as follows.

EXAMPLE 1

Place phosphoric acid crystals and a 2 to 10 mole % charge of Pd black in an autoclave that is fitted with an internal glass sleeve and titanium internal parts. Purge the autoclave with hydrogen gas several times before pressurization to 1–500 atm. Then raise the autoclave temperature to 50–180° C. for three hours. The product will be a mixture that comprises phosphorous acid and hypophosphorous acid.

In a variation of example 1, a back pressure regulator is used to allow the water generated in the reaction to be purged from the system. Such an arrangement would aid in driving the reaction to completion.

EXAMPLE 2

Place a suspension of phosphorus pentoxide with 2–10 mole % palladium black in a hydrocarbon solvent in an autoclave that is fitted with an internal glass sleeve and titanium internal parts. Purge the autoclave with hydrogen gas several times before pressurization to 1–500 atm. Then raise the autoclave temperature to 50–180° C. for three hours. The product will be a mixture that comprises phosphorous acid and hypophosphorous acid.

EXAMPLE 3

Place phosphoric acid crystals (50 g, 510.2 mmol) and a 5 mole % charge of Pd black (2.71 g ,25.5 mmol) in a 50 mL autoclave that is fitted with an internal glass sleeve and titanium internal parts. Purge the autoclave with hydrogen gas several times before pressurization to 400 atm. Then raise the autoclave temperature to 150° C. for three hours. The product will be a mixture that comprises phosphorous acid and hypophosphorous acid.

In a variation of example 3, a back pressure regulator is used to allow the water generated in the reaction to be purged from the system. Such an arrangement would an aid in driving the reaction to completion.

EXAMPLE 4

Place a suspension of phosphorus pentoxide (10 g, 35.2 mmol) with 5 mole % palladium black (0.187 g, 1.76 mmol) in a hydrocarbon solvent in an autoclave that is fitted with an internal glass sleeve and titanium internal parts. Purge the autoclave with hydrogen gas several times before pressurization to 400 atm. Then raise the autoclave temperature to 150° C. for three hours. The product will be a mixture that comprises phosphorous acid and hypophosphorous acid.

The examples herein can be performed by substituting the generically or specifically described reactants and/or operating conditions of this invention for those used in the preceding examples.

The invention being thus described, it is apparent that the same can be varied in many ways. Such variations are not to be regarded as a departure from the spirit and scope of the present invention, and all such modifications and equivalents as would be obvious to one skilled in the art are intended to be included within the scope of the following claims.

What is claimed is:

1. A process for the preparation of a P(I) species, said process comprising contacting a P(V) species with a reducing agent in the presence of a reducing catalyst for the reduction of said P(V) species.

2. The process of claim 1 wherein said reducing catalyst comprises a Group VIII transition metal.

3. The process of claim 2 wherein said reducing agent comprises hydrogen gas.

4. The process of claim 3 wherein said P(V) species is contacted with hydrogen at a hydrogen pressure of between about 50 kPa and about 50,000 kPa.

5. The process of claim 3 wherein said P(V) species is contacted with hydrogen at a temperature of between about 0° C. and about 1000° C.

6. The process of claim 3 wherein said reducing catalyst comprises a metal selected from the group consisting of Pd, Rh, Ni, and Pt.

7. The process of claim 6 wherein said reducing catalyst is Pd.

8. The process of claim 6 wherein said reducing catalyst is Ni.

9. The process of claim 1 wherein said P(V) species is selected from the group consisting of phosphorus pentoxide, phosphoric acid, phosphoric acid salts, polymers of phosphoric acid, salts of polymers of phosphoric acid, $P_2S_5$, and phosphorus sulfoxide.

10. The process of claim 9 wherein said P(V) species comprises phosphoric acid.

11. The process of claim 9 wherein said P(I) species is oxidized by reaction with water in the presence of an oxidizing catalyst, thereby producing a solution comprising phosphorous acid.

12. The process of claim 11 wherein said reducing catalyst is also effective as the oxidizing catalyst.

13. The process of claim 1 wherein said reduction is carried out in a liquid medium comprising a solvent and by-product water or $H_2S$ is removed from said liquid medium.

14. A process for the preparation of a P(III) species, said process comprising contacting a P(V) species with hydrogen gas in the presence of a reducing catalyst for the reduction of said P(V) species.

15. The process of claim 14 wherein said reducing catalyst comprises a Group VIII transition metal.

16. The process of claim 15 wherein said P(V) species is contacted with hydrogen at a hydrogen pressure of between about 50 kPa and about 50,000 kPa.

17. The process of claim 15 wherein said reducing catalyst comprises a metal selected from the group consisting of Pd, Rh, Ni, and Pt.

18. The process of claim 17 wherein said reducing catalyst is Pd.

19. The process of claim 17 wherein said reducing catalyst is Ni.

20. The process of claim 14 wherein said P(V) species is selected from the group consisting of phosphorus pentoxide, phosphoric acid, phosphoric acid salts, polymers of phosphoric acid, salts of polymers of phosphoric acid, $P_2S_5$, and phosphorus sulfoxide.

21. The process of claim 20 wherein said P(V) species comprises phosphoric acid.

22. The process of claim 14 wherein said reduction is carried out in a liquid medium comprising a solvent and by-product water or $H_2S$ is removed from said liquid medium.

23. A process for the preparation of a mixture comprising a P(I) species and a P(III) species, said process comprising contacting a P(V) species with hydrogen gas in the presence of a reducing catalyst for the reduction of said P(V) species.

24. The process of claim 23 wherein said reducing catalyst comprises a Group VIII transition metal.

25. The process of claim 24 wherein said P(V) species is contacted with hydrogen at a hydrogen pressure of between about 50 and about 50,000 kPa.

26. The process of claim 24 wherein said reducing catalyst comprises a metal selected from the group consisting of Pd, Rh, Ni, and Pt.

27. The process of claim 26 wherein said reducing catalyst is Pd.

28. The process of claim 26 wherein said reducing catalyst is Ni.

29. The process of claim 23 wherein said P(V) species is selected from the group consisting of phosphorus pentoxide, phosphoric acid, phosphoric acid salts, polymers of phosphoric acid, salts of polymers of phosphoric acid, $P_2S_5$, and phosphorus sulfoxide.

30. The process of claim 29 wherein said P(V) species is phosphoric acid.

31. The process of claim 23 wherein said reduction is carried out in a liquid medium comprising a solvent and by-product water or $H_2S$ is removed from said liquid medium.

32. A process for the preparation of a lower hydrides of phosphorus, said process comprising contacting a P(V) species with hydrogen gas in the presence of a reducing catalyst for the reduction of said P(V) species.

33. The process of claim 32 wherein said reducing catalyst comprises a metal selected from the group consisting of Pd, Rh, Ni, and Pt.

34. The process of claim 33 wherein said reducing catalyst is Pd.

35. The process of claim 33 wherein said reducing catalyst is Ni.

36. The process of claim 32 wherein said P(V) species is phosphoric acid.

* * * * *